(12) United States Patent
Freyman et al.

(10) Patent No.: US 6,947,554 B2
(45) Date of Patent: Sep. 20, 2005

(54) LEAST MEAN POWER CONSUMPTION IN TELECOMMUNICATIONS SYSTEMS

(75) Inventors: Phillip Kent Freyman, Elgin, IL (US); Christopher R. Bach, Elgin, IL (US)

(73) Assignee: Motorola, Inc., Horsham, PA (US)

( * ) Notice: Subject to any disclaimer, the term of this patent is extended or adjusted under 35 U.S.C. 154(b) by 106 days.

(21) Appl. No.: 10/007,452

(22) Filed: Nov. 8, 2001

(65) Prior Publication Data

US 2003/0093701 A1 May 15, 2003

(51) Int. Cl.[7] .............................................. H04M 19/00
(52) U.S. Cl. ................................. 379/413; 379/413.02
(58) Field of Search ............................ 379/413, 413.02

(56) References Cited

U.S. PATENT DOCUMENTS

| | | | | |
|---|---|---|---|---|
| 5,323,461 A | * | 6/1994 | Rosenbaum et al. | ........ 379/413 |
| 6,088,599 A | * | 7/2000 | Fujiwara | ..................... 379/413 |
| 6,233,335 B1 | * | 5/2001 | Ludeman | .................... 379/413 |
| 6,574,333 B1 | * | 6/2003 | Manchester et al. | ........ 379/412 |

* cited by examiner

*Primary Examiner*—Xu Mei
*Assistant Examiner*—Daniel Swerdlow
(74) *Attorney, Agent, or Firm*—Esteban H. Rockett

(57) ABSTRACT

A programmable access point (110) has a line driver (201), sensors (202), comparator and control logic (203), a power supply (206), and a backup power supply (207). The line driver (201) provides power and communications signals to attached customer equipment and receives its power from either the power supply (206) or the backup power supply (207). The power supplies (206, 207) generate power supply status signals which include a signal indicating whether line driver (201) is receiving power from the power supply (206) or the backup power supply (207) and a signal indicating the reserve capacity of the backup power supply (207). The sensors (202) monitor the power output by the line driver (201). The comparator and control logic (203) receives the power supply status signals and the monitored power output values and generates a control value for line driver (201) which it provides to the line driver (201) which modifies its output responsive to the control value.

64 Claims, 5 Drawing Sheets

LEAST MEAN POWER CONSUMPTION IN TELECOMMUNICATIONS SYSTEMS

BACKGROUND OF THE INVENTION

1. Field of the Invention

The present invention relates to telecommunication networks, and more particularly to dynamic power adjustment in telecommunications network power management.

2. Background Description

Generally, a telecommunications network links together distributed communications equipment such as telephones, facsimile machines, modems, and the like which all may be located on a customer's premises. In a typical telecommunications network such as a telephone network or plain old telephone service (POTS), a central network communicates with each customer's premises through an access point. The access point normally supplies power to any connected communications equipment at the particular customer's premises. The level of power supplied is typically set for the maximum rated load for the access point, i.e., the largest number of telecommunications devices, e.g., telephones, that are to be allowed to be in simultaneous use. Customer premises include, for example, an office, business location, or residential home.

Further, a typical telephone uses much more power off-hook than on-hook. So, an access point providing power to a multiextension home rated to provide power for simultaneous use by 4 phones may brown out when 5 are off-hook simultaneously and so forth. However, when only a single phone is off-hook, that same access point is providing much more power than is necessary, all of which is wasted.

Thus, there is a need for a telecommunications system wherein power provided to connected customer equipment is managed dynamically to minimize wasted power.

DETAILED DESCRIPTION OF EMBODIMENTS

Figure 1:
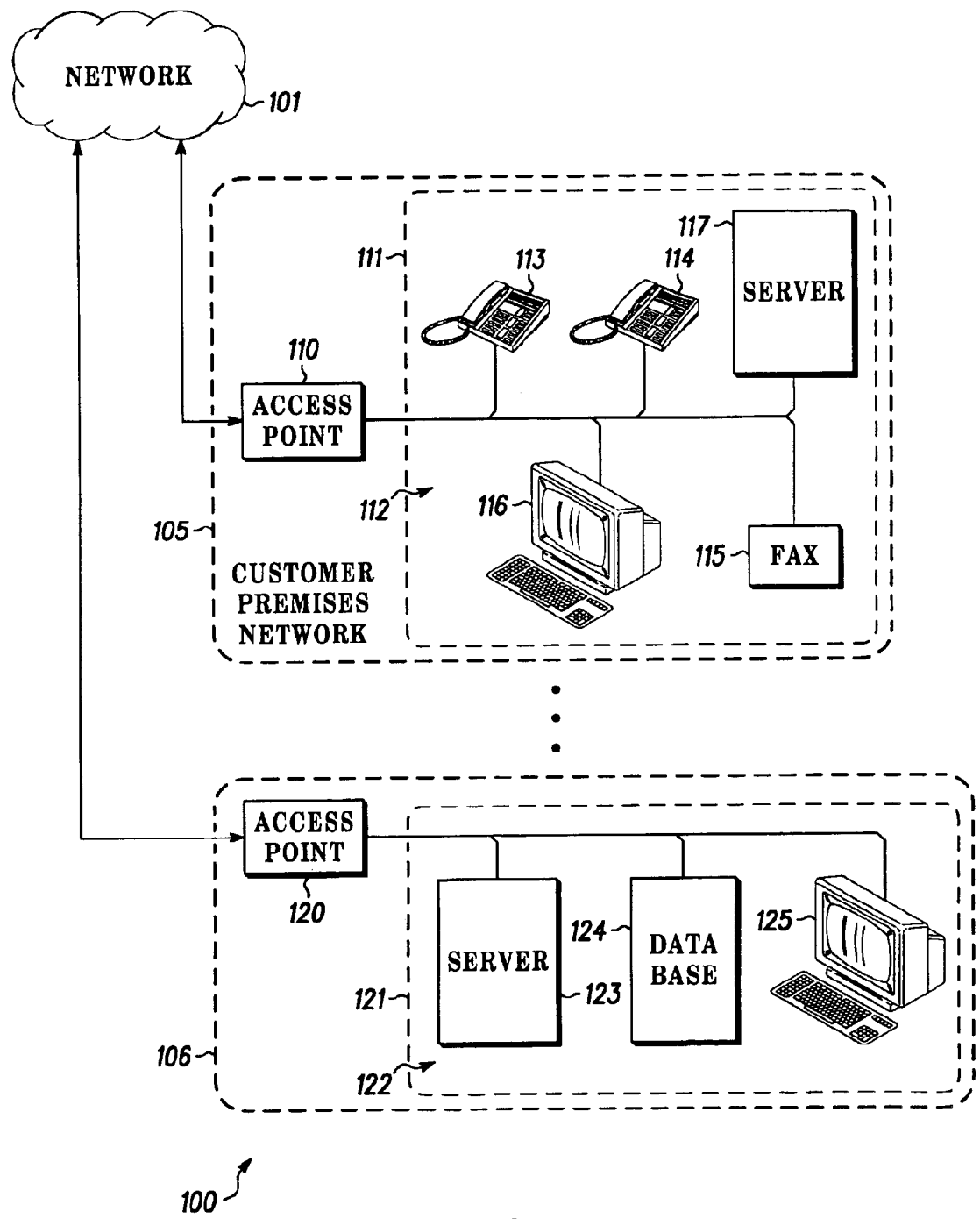
FIG. 1 shows a diagram of a telecommunications network including at least one customer premises network according to an embodiment of the invention.

Turning now to the drawings and more particularly FIG. 1, a general communications network 100 is shown, such as a telephone network.

Network 101 is coupled to an access point 110 within a customer premises network 105. The access point 110 is coupled to customer premise equipment 112 which consists of telephones 113 and 114, a fax machine 115, a computer terminal 116, and a server 117. The customer premise equipment 112 is shown located in customer premises 111 such as a residence, a suite, a building, or group of buildings as in a campus. Network 101 is further coupled to an access point 120 within another customer premises network 106. Access point 120 is coupled to customer premise equipment 122 which consists of a server 123, a database 124, and a workstation 125. Customer premise equipment 122 is shown located in customer premises 121. It is understood that network 101 can be connected to further access points as indicated by the ellipsis shown in FIG. 1.

Customer premise equipment, also referred to as customer equipment devices, 112 and 122 each show, by way of example, one possible set of devices at a customer's premises, but other configurations are possible. The coupling between each of the customer premise equipment devices and their respective access points and between the access points and the network 101 may each be any form of connection permitting communications such as, but not limited to, wired and wireless connections (e.g. twisted copper pairs, fiber optic cables, telephone cables, or any radio frequency-based approach including, for example, cellular telephonic connection).

It will be appreciated that this invention is applicable to one or simultaneously to a multiplicity of customer premises networks as described herein. Network 101 allows communication between devices located at different customer premises. By way of example, network 101 will allow computer terminal 116 to communicate with database 124. To do this, computer terminal 116 initiates communication through access point 110 to network 101. Network 101 then routes the communication through access point 120 to the database 124. In order to operate, some of the devices coupled to access points 110 and 120 require power to be supplied. In an embodiment, required power is suppled by the access points 110 and 120. By way of example, both telephones 113 and 114 require power to function and this power is delivered from access point 110 over the connecting communication line.

Figure 2:
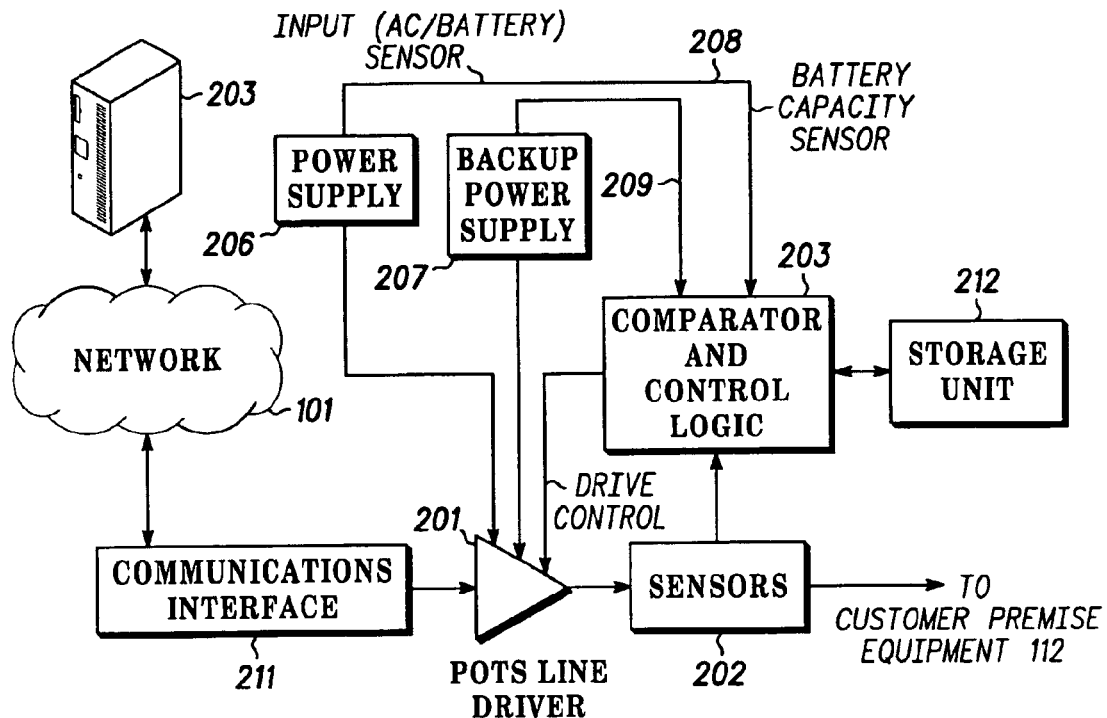
FIG. 2 shows a diagram of a programmable access point for interfacing a communications network in accordance with an embodiment.

FIG. 2 shows a general schematic of an example of an embodiment of a programmable access point, such as access point 110, according to this invention.

In operation, POTS line driver 201 (also referred to as a subscriber line driver) interfaces with the network 101 through a communications interface 211. POTS line driver 201 also interfaces with customer premise equipment 112. As an example, POTS line driver 201 receives first communication signals from network 101 through communications interface 211 and sends these second communication signals to a customer premise equipment device, such as one of the devices 113–117 illustrated in FIG. 1, for example. The communications interface 211 carries out interfacing operations such as, but not limited to, signal level adjustment and signal timing adjustment on received communications signals. Further to the previous example, the customer premise equipment device can respond by sending a second communication to the access point 110 which is conditioned by communications interface 211 and sent to network 101. Suitable implementations of the POTS line driver 201 are well-known in the art and are not described in further detail. In one embodiment, POTS line driver 201 is programmable and receives and stores at least one operating point (which POTS line driver 201 uses to control the level of its output) from comparator and control logic 203.

POTS line driver 201 also provides the power to connected customer premise equipment 112 along the same communication lines (referred to as customer subscriber lines or subscriber lines) used for the first and second communication signals. As the POTS line driver 201 supplies power to the customer premise equipment along a subscriber line, the electrical load the customer premise equipment 112 presents to the POTS line driver 201 is referred to as the subscriber line load or subscriber line driver load. The power which is provided to the customer premise equipment 112 is provided by the POTS line driver 201 and is supplied to the POTS line driver 201 by the active power supply. The active power supply is whichever of the power supply 206 or the backup power supply 207 which is providing power to POTS line driver 201. Generally, this will be power supply 206. In the case of a failure of power supply 206, the backup power supply 207 is provided to take over the job of supplying power to POTS line driver 201. When the power saving features of the present invention are enabled, the power provided by the POTS line driver 201 to the customer premise equipment 112 is controlled by comparator and control logic block 203.

Sensors 202 sense electrical characteristics on the communications lines coupling the POTS line driver 201 with the customer premise equipment 112. These sensed electrical characteristics are herein referred to as measured values. These measured values may include, but are not limited to, a voltage value and a current value. In an embodiment, the electrical characteristics chosen to be sensed can be any which are indicative of the power usage of the customer premise equipment 112. Sensors 202 provide output signals representative of the sensed electrical characteristics to comparator and control logic block 203. These output signals will vary with many things such as which customer premise equipment devices (e.g. devices 113–117) are attached to the POTS line driver 201, which devices are off-hook (i.e. active), and what modes of operation the devices which are active are in. Suitable implementations of the sensors 202 are well-known in the art, are available "off the shelf", and are therefore not discussed in any further detail.

The comparator and control logic block 203 receives an input sensor signal over connection 208 from power supply 206. The comparator and control logic block 203 also receives a battery capacity sensor signal over connection 209 from backup power supply 207. Collectively, these power supply sensor signals are referred to as power supply status signals and they indicate the operating status of the power supplies. One operating state which is of concern is when power supply 206 is unable to fully supply the power required by POTS line driver 201, a state which is called a low power state. A second operating state of concern is when backup power supply 207 has a low power reserve, a state called a low capacity state. Comparator and control logic block 203 provides operating values to POTS line driver 201. The operating values provided to POTS line driver 201 define the operating point at which the POTS line driver 201 is to operate when delivering power to the customer premises equipment.

The comparator and control logic block 203 controls the current or voltage levels delivered by the POTS line driver 201 to the customer premise equipment. In an embodiment, comparator and control logic block 203 comprises a processing unit having suitable programming. In an embodiment, comparator and control logic block 203 will control the subscriber line voltage level (also referred to as line driver drive level or drive voltage) as voltage control is a common constant voltage method used by plain old telephone service (POTS) systems. Alternatively, for constant current systems, an embodiment where the comparator and control logic block 203 controls current level or drive current is used. Comparator and control logic block 203 controls the voltage drive level by analyzing the measured values of the electrical characteristics and comparing them against the set point values (also referred to as operating load limits) and previous set point values and calculating new values for the set point values.

An exemplary algorithm by which comparator and control logic block 203 operates to analyze and calculate new set point values is shown in FIGS. 3–6. The algorithm of FIGS. 3–6 may be implemented in hardware, software, or a combination of both.

The problem of inefficient power supply in traditional telecommunications networks can be addressed by dynamically varying the power supply in response to sensor feedback of the actual load conditions. By adapting the power drive level to the actual load on a per access point basis, the overall network power consumption can be optimized to the Least Mean Power (LMP) that is required to provide acceptable service to each access point. Least Mean Power refers to delivering the lowest average power which provides all the operating requirements for the customer premises equipment (CPE) devices attached to the network. Additionally, by adapting the source power on a per access point basis, each access point can be optimized to minimize network power loading and/or to optimize back up battery run times by minimizing the available access point source power.

For discussion purposes, use is made herein of plain old telephone service (POTS) technology to describe an exemplary utilization of the present invention. It is to be understood that this is by way of example only and is not limiting.

In plain old telephone service networks, customers access the network with two lines, historically referred to as the tip and the ring. The tip line has a higher voltage than the ring line. Traditionally, the tip line was held at or around earth ground and the ring line was, in the on-hook situation, maintained at a lower voltage, normally intended to be about −48 volts with respect to the tip line.

Devices on plain old telephone service networks may be connected in parallel or series depending on technology used or other design choices. As discussed previously, in systems in which devices are connected in parallel, power is generally provided by the system is in a constant voltage mode. However, due to technology or system design choices, systems devices are sometimes connected in series and in such cases power is provided in a constant current mode. In either case, a change in the customer premises equipment impedance by either the addition of more devices or by the change in the operating state of existing devices on the network will alter the power sharing balance which had been in effect. This sharing of power across multiple devices will, as the customer premises equipment load increases, result in degraded performance or, in more extreme situations, failure to operate some of the devices. As the standards for the design of customer premises equipment devices allows for wide disparity in operating characteristics, under heightened load conditions some customer premises equipment devices may continue to operate with adequate power although others may fail to operate because they receive insufficient power.

Plain old telephone service networks currently have three basic operating modes with respect to the customer premises equipment devices attached to them: on-hook, off-hook, and ring.

The on-hook mode occurs when all customer premises equipment devices on the line are "off-line" or "hung-up". In this mode, customer premises equipment devices present a high impedance state to the network and thus draw little or no current through the access point.

The off-hook mode occurs when one or more customer premises equipment devices are no longer in the on-hook mode and present a low impedance state to the network. In the off-hook state, devices will draw loop current from the access point. The magnitude of the loop current drawn by any single device will depend in part on whether the loop is acting as a constant voltage or constant current source.

If the POTS line driver 201 (i.e. the SLIC) is in a constant voltage mode, then each device current will be defined by the following basic relationship:

$$I_{device} = \frac{V_{loop} - I_{devicen} * R_{loop}}{R_{device} + R_{loop}}$$

Wherein:
$I_{device}$=the current of the device
$I_{device}$=the current of all off-hook devices
$R_{device}$=the resistance of the device
$R_{loop}$=the resistance of the loop
$V_{loop}$=the voltage of the loop When multiple devices are off-hook, each device will receive the available current up to the capable limit of the voltage source (less loop line resistance and internal source losses). When the loop voltage source approaches its capacity, the loop voltage will decrease due to internal source losses and the device currents will decrease linearly.

If the POTS line driver 201 is in a constant current mode, then each device current will be defined by the relationship:

$$I_{device} = \frac{I_{loop} * R_{parallel\_devices}}{R_{device}}$$

And
$V_{T-R} = I_{loop} * R_{parallel-devices}$
Wherein:
$I_{device}$=the current of the device
$I_{loop}$=the current of the loop
$R_{device}$=the resistance of the device
$R_{parallel\_devices}$=the resistance of all devices
$V_{T-R}$=the tip-to-ring voltage These equations apply in the situation where all devices are attached in parallel. In constant-current mode, the tip to ring voltage becomes a function of the total parallel impedance and the constant current loop set point. As multiple devices go off-hook, the tip to ring voltage will decrease as per Ohm's law because the loop current is limited while the total loop impedance is decreasing.

The ring mode occurs when a ring signal is being presented by the network to one or more customer premises equipment devices.

In either the constant voltage mode or the constant current mode, a corresponding change will occur in the voltage or current of the loop, respectively, as per Ohm's law. These changes can be detected and then compared to either threshold values or specific target levels. If the threshold points or target values are exceeded, the control logic can adjust the POTS line driver 201 programming to either increase or decrease the available power or so as to obtain the optimized tradeoff between power consumption and customer premise equipment performance requirements. An enhancement to the detection of levels and comparison to specific reference values would be to detect a change in current or voltage and respond to a change in state.

The general flow of steps in one embodiment for controlling the drive level of POTS line driver 201 is as follows:

1) Load set point default_values. The set points are used as reference values in determining whether the POTS line driver 201 output is within acceptable limits. The set point default_values are predetermined network-wide values for the set points.

2) Check storage/memory (can be a remote storage/memory) to determine if provisioned set point values exist, and if so, load the provisioned set point values. Provisioned set point values are predetermined access point-specific values for the set points.

3) check storage/memory (can be a remote storage/memory) to determine if the power-saving feature is enabled. If the power-saving feature is enabled, set a power_feature_enabled_flag to true. If the power-saving feature is not enabled, set a power_feature_enabled_flag to false.

4) If the provisioned set point values were loaded, set the variable set_point_values equal to the provisioned set point values, otherwise set the variable set_point_values equal to the set point default_values.

5) Set the variable driver_operating_values equal to set_point_values. The variable driver operating values is the value given to the POTS line driver 201 which controls the power output for the POTS line driver 201.

6) Store driver_operating_values to the POTS line driver 201.

7) Read the variables power_source_input_status and backup_capacity. The variable power_source_input_status reports which power supply (e.g. which of the group of main power supply and backup power supply) is supplying power to the POTS line driver (201). The variable backup_capacity reports the capacity remaining in the backup power supply as a fraction of full capacity.

8) When either power_source_input_status indicates the backup power supply is supplying power or the backup_capacity equals or is less than a low threshold, set a variable low_power_flag to true.

9) When both the low_power_flag is true and a variable power_feature_enabled_flag is true, then both set the variable operating_values equal to a variable minimum_operating_values and return to step (6). The variable power_feature_enabled_flag is a flag which indicates whether or not the dynamic power feature of the present invention is enabled or not. The variable minimum_operating_values represents the minimum values for the variable operating_values.

10) Measure the tip-to-ring voltage/current and store in the variable measured_values.

11) When the variable measured_values is less than the variable set_point_values and low_power_flag is false and power_feature_enabled_flag is true, then increment the variable operating values.

12) When the variable measured_values is equal to or greater than the variable set_point_values and power_feature_enabled_flag is true, then decrement the variable operating_values.

13) Go to step (6).

As can be appreciated, this network includes signaling, sensing, and control elements driving a plurality of access points (e.g. a plain old telephone service tip and ring physical interface) where each access point provides operating power to external load devices (customer premise equipment).

As also can be appreciated, each access point includes a power source (current/voltage) and a line driver with a monitor for actual current/voltage levels, a detection/comparison device, and a control device that can adjust the delivered current/voltage to the access point to minimize the necessary delivered power for proper customer premise equipment operation.

Figure 3:
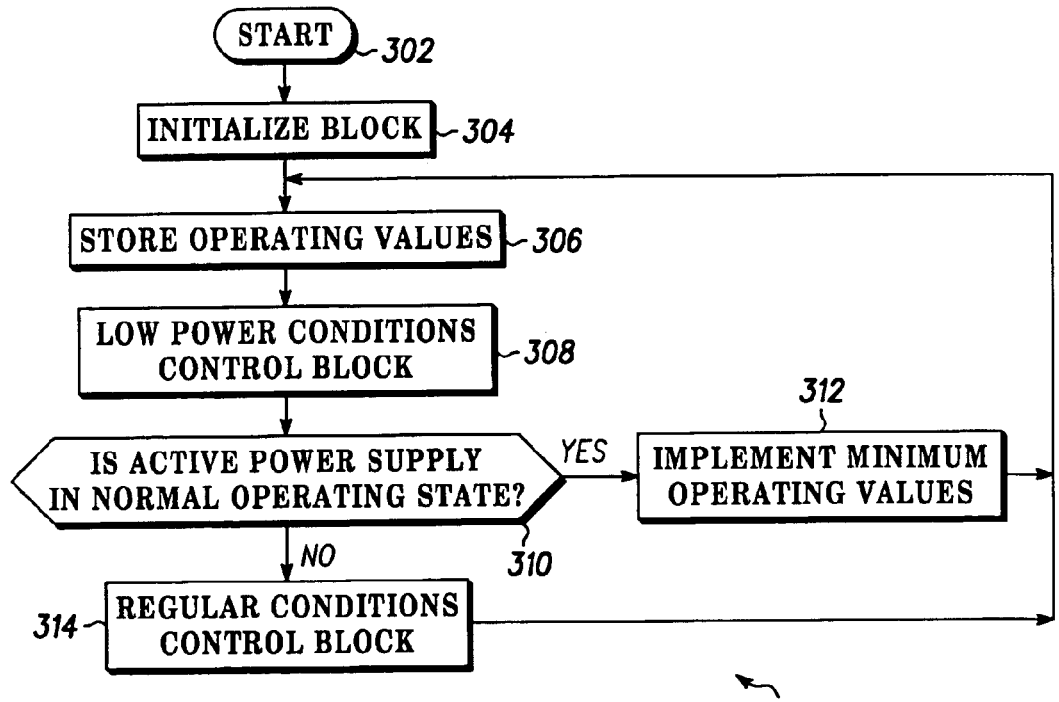
FIGS. 3–6 show an exemplary control algorithm of comparator and control logic for current level/drive current control in accordance with an embodiment.

FIG. 3 shows a block diagram of an exemplary algorithm 300 for operation of comparator and control logic 203 in an embodiment. Algorithm 300 provides a more detailed explanation of an embodiment of the algorithm described just previously herein.

With reference to FIG. 3, the control algorithm 300 starts 302 by initializing 304 certain initial conditions (as described in greater detail later herein with reference to FIG. 4). The control algorithm 300 then stores 306 certain operating values for later reference and use. These operating values can include metrics that define the desired POTS line driver 201 operating point. Next, the control algorithm 300 assesses 308 low power conditions for a corresponding power supply (as described in greater detail below with reference to FIG. 5). Then, the control algorithm 300 makes a decision 310 with respect to whether the active power supply (which can be either in the power supply 206 or the backup power supply 207) is functioning normally. (In one embodiment, the power supply 206 itself receives power from a standard alternating current source; hence a general mode of failure in this case would be a "low-power state." Further to this embodiment, the backup power supply 207 can be a battery. Thus a likely mode of failure for this backup power supply 207 would be a "low capacity state.") The active power supply would be whichever power supply is currently providing power to the POTS line driver 201. The decision 310 regarding functionality of the active power supply can therefore include comparing status information for the presently active power supply against appropriate corresponding predetermined operating ranges. When this decision 310 identifies abnormal power supply status, the algorithm 300 sets 312 the initial operating values to predetermined minimum operating values.

Minimum operating values are operating values which have been predetermined to be the operating values which cause the POTS line driver 201 to provide the minimum useful amount of power to the customer premise equipment. Generally, the minimum operating values provide for power levels which allow for only one or at most, a few, customer premise equipment devices to operate at the same time. Minimum operating values are designed for use only in unusual situations, such as when power supply 206 and backup power supply 207 are both not in normal operating states. The minimum operating values are generally predetermined by network engineers to be the necessary operating state for the access point given a condition of low power supply capability. After implement minimum operating values block 312, control passes back to the top of store operating values block 306. When it is determined in is power supply in low power state decision block 310 that the active power supply is operating in a normal state, control continues to regular conditions control block 314. Regular conditions control block is described in detail hereinafter in reference to FIG. 6. After regular conditions control block 314, control passes back to store operating values block 306. Thus, in this embodiment, control continually loops.

Figure 4:
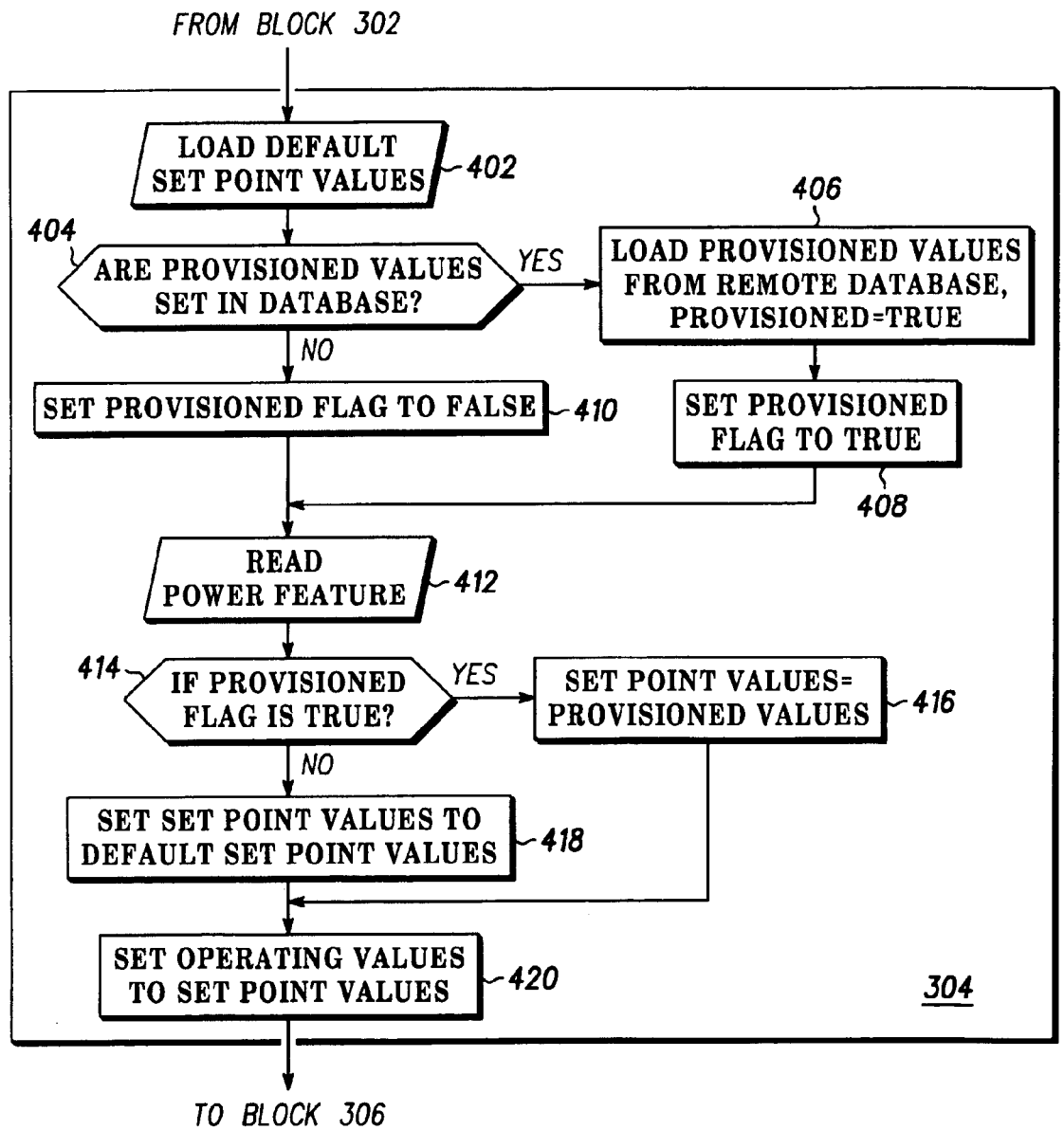

FIG. 4 shows an exemplary implementation of the initialize block 304 of FIG. 3.

The algorithm 300 comes from start indicator 301 (shown in FIG. 3) and loads 402 default set point values from memory or other source such as storage unit 212. Set point values are values which define preset tolerance ranges for the operating point of POTS line driver 201. Set point values are generally defined by network technicians or network operators or the like and represent general values determined for a general access point and generally not specifically for a particular access point. Next, the algorithm 300 checks 404 the memory or storage to determine if provisioned set point values have been set. Provisioned set point values are generally similar to default set point values but are determined for a specific access point after taking into account the specific nature of the access point, the customer premises equipment devices attached thereto, and the operating norms of the customer premises equipment devices.

If provisioned set point values are determined to exist, they are loaded or read 406 and a provisioned flag is set 408 to true. The provisioned flag is a software (or hardware) flag indicating whether provisioned set point values were stored in memory. If provisioned set point values are not found in memory, the algorithm 300 sets 410 the provisioned flag to false. After setting the provisioned flag, memory or storage is read 412 to determined if the power saving feature of the present invention is to be implemented. If the provisioned flag is true, the set point values are set 416 to the previously read provisioned set point values. Otherwise, if the provisioned flag is false, the set point values are set 418 to the previously read default set point values. Next, the operating values are initialized 420 to the just-determined set point values. Thus, the initialize block 304 is finished and algorithm 300 proceeds to store operating values block 306, shown in FIG. 3.

These various values (default set point values, provisioned set point values, power feature flag, provisioned flag), as a group or in any sub-combination desired, may be stored in memory located remotely on the network, such as in central database 203, or local to the access point 110.

Figure 5:
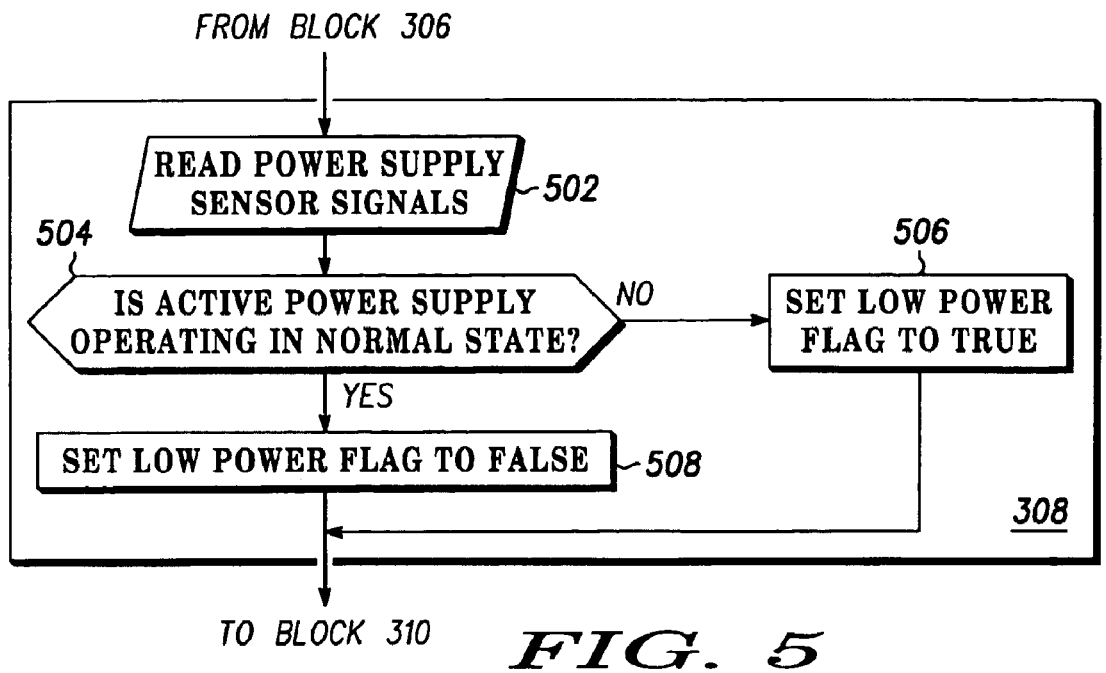

FIG. 5 shows an exemplary algorithm in one embodiment for the low power conditions control block 308 of FIG. 3. This figure shows one method for determining and handling the situation when the active power supply is in a low power state.

In operation, the algorithm 300 continues from the store operating values block 306 of FIG. 3 and reads 502 the active power supply sensor signal (i.e. the input sensor signal on connection 208 when power supply 206 is active or the battery capacity sensor signal on connection 209 when backup power supply 207 is active) is read. The algorithm 300 then checks 504 the active power supply sensor signal against normal power supply operating values to determine whether the active power supply is operating normally or not. If the active power supply is not operating in a normal operating range, the algorithm 300 sets 506 a low power flag to true. The low power flag can be maintained in any available memory such as, but not limited to, ram or more permanent storage. If the active power supply is operating in a normal operating range, the algorithm 300 sets 508 the low power flag to false. After setting the low power flag, the algorithm 300 next continues to block 310 shown in FIG. 3.

The low power flag, as set in either blocks 506 or 508, is used by the algorithm 300 in determining whether to set minimum operating values in block 312 as discussed in reference to FIG. 3 previously herein.

Figure 6:
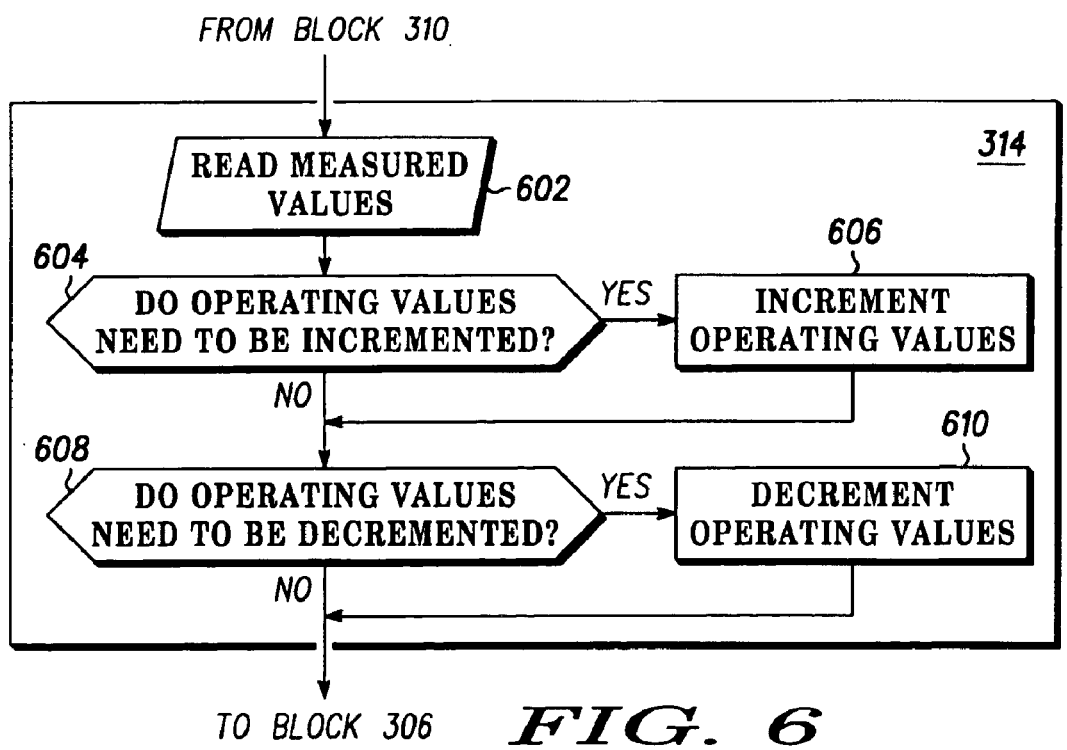

FIG. 6 shows an exemplary algorithm for regular conditions control block 314. This algorithm handles any required adjustment of the operating values in response to measured conditions.

In operation, the algorithm 300 continues from the active power supply in low power state decision block 310 shown in FIG. 3 and reads 602 the signals from sensors 202 representing the electrical characteristics of the POTS line driver 201 output. As previously discussed, these characteristics may be, but are not limited to, such things as the voltage across the output lines of the POTS line driver 201 or the current drawn by the customer premise equipment attached to the output of POTS line driver 201. The algorithm 300 then determines 604 whether the measured values indicate that the output of the POTS line driver 201 is such that the operating values need to be incremented.

There are actually three conditions which must be met before a determination that the operating values must be incremented is made. The first condition is whether the measured values are below the set point values. The second condition is whether the low power flag is false. The third condition is whether the power feature flag is true (i.e. the power saving abilities of the present invention are to be implemented). Only when the measured values are below the set point values, the low power flag is false, and the power feature flag is true is the determination positive. If this is the case, the algorithm 300 increments 606 the operating values. Incrementing of the operating values can take many forms, but in an embodiment, incrementation would take place by the addition of a preset value.

Thereafter, or if the operating values are not to be incremented, the algorithm 300 determines 608 whether the operating values must be decremented. There are two conditions which must be met before a determination that the operating values must be decremented is made. The first condition is whether the measured values are greater than, or equal to, the set point values. The second condition is whether the power feature is true. Only if the measured values are greater than or equal to the set point values and the power feature flag is true is a determination that the operating values must be decremented made. If this is the case, the operating values are decremented 610. Decrementing of the operating values can take many forms, but in an embodiment, decrementation would take place by the subtraction of a preset value. Thereafter, or if the operating values do not need to be decremented, the algorithm 300 passes out of block 314 and continues to block 306 discussed previously herein in reference to FIG. 3.

The increment and decrement values are, in an embodiment, set by network technicians during the initial setup of an access point, and are considered fixed values. They may be altered or changed by network operators whenever needed to address the average or peak operating conditions of the customer premise equipment devices and the capabilities of the access point change or indicate that revision of the increment and decrement values is necessitated.

This algorithm or its operational equivalents may be used to provide power over networks at a least mean power level. Least mean power level means that the mean (or average) power waste is minimized. By detecting the voltage/current relationship at the access point, it is possible to dynamically adapt the network drive source so as to only provide the power required by the customer premise equipment load at a specific access point during a specific period of time. By adapting the drive level to the actual load on a per access point basis, the overall network power consumption can be optimized to the least mean power that is required to provide acceptable service to each individual access point. Additionally, by adapting the source of power on a per access point basis, each access point can be optimized to minimize network power loading or to optimize back up battery run times by minimizing the available access point source power.

By use of the present invention, power supplies can be minimized to allow the addition of at least one extra device and allow it to work while the system is on backup power. This is because, by setting the operating values to minimum operating values, at least one device is allowed to operate, but the extra power for more devices is saved thus hopefully allowing operation within the capabilities of a malfunctioning power supply 206 or extending the operation time of a partially drained backup power supply 207 (a battery in one embodiment).

Figure 7:
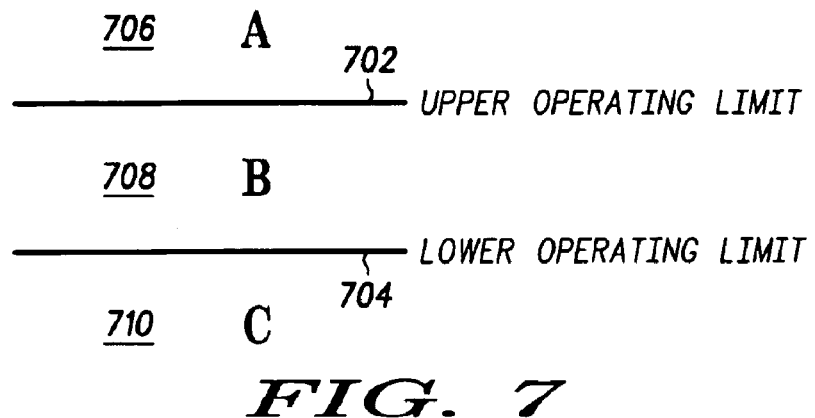
FIG. 7 shows an example of operating limits for the output of a POTS line driver used in a programmable access point according to FIG. 2.

Referring to FIG. 7, shown is a diagram showing an operating limit range.

Shown is an upper operating limit 702, a lower operating limit 704, an A region 706, a B region 708, and a C region 710.

Together, the upper operating limit 702 and the lower operating limit 704 comprise operating limits, or an operating limit range, for the output of POTS line driver 201. Specifically, comparator and control logic block 203 uses the operating range in comparing the measured values output by sensors 202 in deciding whether new values for the set points or operating values are required. If the measured values fall in range A 706, then the measured values are too high (indicating that the subscriber line load of the customer premise equipment has fallen), and thus the operating values are decremented by algorithm 300. Similarly, if the measured values fall in region C 710, the measured values are to low indicating that the load has increased, and so the line driver operating values are increased by algorithm 300. If the measured values fall in region B 708, no change in the operating values is required.

Figure 8:
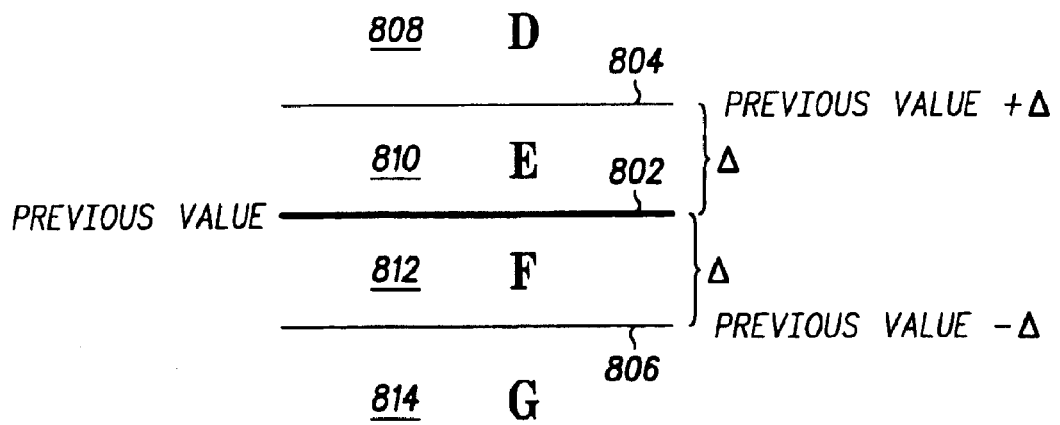
FIG. 8 shows an example of the step increment test as another embodiment for accessing operating limits.

Regarding FIG. 8, shown is an alternative method of evaluating the measured values referred to as a step increment test.

Shown is a previous value 802, a previous value 7+delta 804, a previous value–delta 806, a D region 808, an E region 810, an F region 812, and a G region 814.

In operation, the step increment test is based on a previous value of the measured values shown here as previous value 802. When the operational status of the customer premise equipment changes by a single increment (i.e. a single device changes state such as going into operation or ceasing operation), this alters the subscriber line load seen by POTS line driver 201. While this change will be different depending on the device and change which occurred, the change detected by sensors 202 will generally be in the same range regardless of device or the nature of the change. Thus, by calculating the previous value 802 plus a delta value (also called a change value or incremental value) this gives previous value +delta 804 which is used as an upper threshold or upper operational limit. Similarly, by calculating the previous value 802 minus a delta value (also called a change value or incremental value) this gives previous value–delta 804 which is used as a lower threshold or lower operational limit. Thus, if the measured values fall in region D 808, then comparator and control logic 203 determines that at least one device has been added to operation and thus the operating values need to be incremented. Similarly, if the measured values fall in region G 814, then comparator and control logic 203 determines that at least one device has been removed from operation and thus the operating values need to be decremented. If the measured values fall in regions E 810 or F 812, then the threshold of change has not been met so no change in the operating values is needed.

It is noted that the embodiments discussed and implied can be applied not only to control the direct current (DC) outputs (such as the dc bias powering attached equipment)

of the POTS line driver 201, but can also be applied to control any alternating current (AC) outputs (such as the communications signals presented to the attached equipment) of the POTS line driver 201. In one embodiment for controlling communications signals, a mean value for the magnitude of the communications signal is determined and compared against frequency set point values in determining the frequency signals operating points.

It is noted that the method embodiments discussed and implied can be implemented in hardware or software running on hardware examples of which are embedded processors or stand-alone personal computers. It is noted also that the method embodiments discussed and implied can be implemented on computer readable mediums such as, but not limited to, optical, punched, or magnetic tape, optical, punched, or magnetic cards, floppy disks, compact discs (including compact disc read only memories or CD-ROMs), digital versatile discs or DVDs (including digital versatile disc read-only memories or DVD-ROMs), pre-programmed chips (such as pre-programmed flash memories, read-only memories or ROMs, etc.), and harddrives.

While the power saving features of the present invention are generally most effective for networks having an off-hook condition, it is noted that the benefits of the present invention may also be effective on networks in an on-hook mode or ring mode.

While this reference description is specific for analog plain old telephone services access networks, the invention can be applied in any system where power consumption is critical and where the load variations can be sensed and the power source can be dynamically adjusted. Additionally, the present invention may be implemented in hardware-only configurations and in hardware plus software configurations.

The advantages of the present invention include, but are not limited to:

1) The minimization of power consumption through dynamic adjustment of the voltage/current relationship so as to maintain adequate power to allow proper customer premise equipment operation without providing excess power when line conditions do not warrant fixed power levels. This allows network designers to avoid the traditional tendency to design "overpowered" networks in attempts to cover all possible customer premise equipment loading. The dynamic adjustment of power provided also permits continued use of legacy equipment with their concomitant higher operating levels. The minimization of power consumption also has the benefit of maximizing access unit operation when running off of backup power supplies such as batteries which have limited capacity. This maximization of backup power operation also can benefit so called "lifeline" services such as telephone access during power outages.

2) The adjustment of the available drive level for power control based on threshold target values.

3) The adjustment of the available drive level for power control based on limit values.

4) The adjustment of the available drive level for power control based on voltage/current changes (allowing identification of secondary devices going off-hook).

5) The capability to set the threshold, limit, or state change values remotely so that further system or customer specific optimization can be achieved.

6) The detection of the loss of main input power and the adjustment of the loop current for a minimum current level to extend the ability to support at least one device while operating on back up power (such as from a battery).

7) The detection of decreasing capacity of the power source and reduction of the loop current to a minimum level to extend the ability to support at least one device.

8) The capability to enable or disable the lowest mean power algorithm and revert to a fixed level operation.

9) The automatic adjustment of power provision also minimizes service provider technical support requirements, lowers service provider operating costs, and enhances the level of service and therefore, customer satisfaction, felt by end users.

The present invention has been described in terms of preferred embodiments, however, it is understood that numerous additional advantages and modifications will readily occur to those skilled in the art. Therefore, the invention in its broader aspects is not limited to the specific details and representative embodiments shown and described herein. Accordingly, various modifications may be made of the general inventive concept without departing from the spirit or scope of the appended claims and their equivalents.

What is claimed is:

1. A programmable access point for interfacing a communications network with communications equipment located at user premises, said programmable access point comprising:

a line driver;

at least one sensing unit sensing the line driver load on said line driver;

a main power supply;

a backup power supply;

at least one power supply status signal indicating operating status of said main power supply and said backup power supply, a processing unit comparing said sensed line driver load with at least one operating load limit, generating a line driver drive level in response to said comparison, said processing unit providing said line driver drive level to said line driver and adjusting said line driver drive level responsive to said at least one power supply status signal.

2. Programmable access point as in claim 1, said line driver driving a user communications line, user communications equipment connected to said user communications line, power being provided to said user communications equipment by said line driver over said user communications line, said line driver adjusting power provided to said user communications equipment in response to said line driver drive level.

3. A programmable access point as in claim 2, said processing unit decreasing said line driver drive level when said comparison indicates said sensed line driver load is less than a lower operating load limit and increasing said line driver drive level when said comparison indicates said sensed line driver load is greater than an upper operating load limit.

4. A programmable access point as in claim 3, said line driver providing a drive voltage controlled by said line driver drive level.

5. A programmable access point as in claim 4, wherein said sensing unit comprises a current sensor sensing a drive current on said user communications line, said drive voltage being adjusted in response to said sensed drive current.

6. A programmable access point as in claim 3, said line driver providing a drive current controlled by said line driver drive level.

7. A programmable access point as in claim 6 wherein said sensing unit comprises a voltage sensor sensing a line voltage on said user communications line, said drive current being adjusted in response to said sensed line voltage.

8. A programmable access point as in claim 6 wherein said sensing unit senses a line dc voltage component, said drive current being adjusted in response to said sensed line dc voltage component.

9. A programmable access point as in claim 8, said sensing unit further comprising a current sensor.

10. A programmable access point as in claim 3, said programmable access point further comprising a communications interface interfacing a communications network with connected user communications equipment, said line driver receiving a communication signal from said communications interface and driving said user communications line in response to said communications signal.

11. A programmable access point as in claim 1, wherein said line driver drive level is set to a minimum operating level when said at least one power supply status signal indicates said main power supply is in a low power state.

12. A programmable access point as in claim 11, wherein said line driver drive level is set to a minimum operating level when said at least one power supply signal indicates said backup power supply is in a low capacity state.

13. A programmable access point as in claim 3, said programmable access point further comprising a storage unit, said storage unit storing at least one provisioned value, at least one default value, and said at least one operating load limit, said processing unit initializing said at least one operating load limit to a selected one of said at least one provisioned value and said at least one default value.

14. A communications network comprising:
a central network;
a plurality of access points connected to said central network; and
a plurality of user lines connecting user equipment to ones of said plurality of access points, said access points selectively passing communication signals between said central network and connected said user equipment, at least one access point providing power over a connected user line to said connected user equipment monitoring user line load, and dynamically adjusting power provided to said connected user equipment in response to said monitored user line load; said at least one access point comprising:
a user line driver providing power to said connected user equipment and driving said communication signals passed to said connected user equipment;
at least one sensing unit sensing said user line load; and
a processing unit determining whether said sensed user line load is within operating load limits, updating said line driver operating point responsive to said determination, and providing said updated line driver operating point to said user line driver; and
a power supply status signal that indicates operating status of at least a main power supply and a backup power supply.

15. A communications network as in claim 14, said processing unit decreasing said line driver operating point in response to said determination indicating that said user line load is less than said operating load limits.

16. A communications network as in claim 15, said processing unit increasing said line driver operating point in response to said determination indicating that said user line load is greater than said operating load limits.

17. A communications network as in claim 16, said communications network further comprising a storage unit, default values and provisional values being stored in said storage unit, said processing unit initializing said operating load limits to one of said provisional values or said default values.

18. A communications network as in claim 17, said user line driver providing a drive voltage controlled by said line driver operating point, wherein said user line driver adjusts power provided to said user equipment by adjusting said drive voltage.

19. A communications network as in claim 18, wherein said sensing unit includes a current sensor sensing a drive current on said user line, said drive voltage being adjusted in response to said sensed drive current.

20. A communications network as in claim 17, said user line driver providing a drive current controlled by said line driver operating point, wherein said user line driver adjusts power provided to said user equipment by adjusting said drive current.

21. A communications network as in claim 20, wherein said sensing unit includes a voltage sensor sensing a user line voltage.

22. A communications network as in claim 20, wherein said sensing unit includes a voltage sensor sensing a dc user line voltage component, said drive current being adjusted in response to said sensed dc user line voltage component.

23. A communications network as in claim 22, wherein said sensing unit further includes a current sensor.

24. A communications network as in claim 22, said processing unit decreasing said line driver operating point when said determination indicates said sensed dc user line voltage component is greater than operating voltage limits, said line driver operating point adjusting said dc user line voltage component.

25. A communications network as in claim 22, said processing unit increasing said line driver operating point when said determination indicates said sensed dc user line voltage component is less than operating voltage limits, said line driver operating point adjusting said dc user line voltage component.

26. A communications network as in claim 22, wherein the processor compares a present sensed dc user line voltage with a previous sensed dc user line voltage, load changes being identified by said comparison, said drive current being adjusted in response to an identified load change.

27. A communications network as in claim 26, said processing unit decreasing said line driver drive when said comparison indicates said load has decreased.

28. A communications network as in claim 26, said processing unit increasing said line driver drive when said comparison indicates said load has increased.

29. A communications network as in claim 16 wherein
a main power supply supplyies power to said user line driver;
the backup power supply supplies backup power to said user line driver.

30. A communications network as in claim 29, wherein said line driver operating point is set to a minimum operating level when said power supply status signals indicate said main power supply is in a low power condition.

31. A communications network as in claim 30, wherein said line driver operating point is set to a minimum operating level when said power supply signals indicate said backup power supply is in a low capacity state.

32. A communications network as in claim 16, wherein each said plurality of access points provides power to connected said user equipment over a connected one of said user lines, monitors said user line load on said connected user line, and dynamically adjusts power provided to connected user equipment in response to said monitored user line load.

33. A control method for adjusting power supplied by a line driver over a user line to attached user equipment, said method comprising the steps of:

a) initializing line driver drive values;
    i) determining if provisioned line driver drive values have been previously set; and
    ii) setting set point values to said provisioned line driver drive values if said provisioned line driver values are determined to have been previously set and, otherwise, setting said set point values to default set point values, said set point values defining a normal operating range;
b) setting a line driver drive in response to said line driver drive values;
c) monitoring characteristics of the output of said line driver;
d) determining whether said monitored characteristics are normal operating range;
e) updating said line driver drive values when said determination indicates said monitored characteristics are not in said normal operating range; and
f) returning to step (b).

34. A control method for adjusting power supplied by a line driver over a user line to attached user equipment, said method comprising the steps of:
a) initializing line driver drive values;
b) setting a line driver drive in response to said line driver drive values;
c) checking power supply status to determine whether line driver power is in a normal power state;
d) continuing to the step (e) of monitoring characteristics if line driver power supplied is determined to be in said normal power state; otherwise setting said line driver drive values to predetermined minimum operating values; and returning to the step (b);
e) monitoring characteristics of the output of said line driver;
f) determining whether said monitoring characteristics are normal operating range;
g) updating said line driver drive values when said determination indicates said monitored characteristics are not in said normal operating range; and
h) returning to step (b);
such that said line driver is set to a minimum power level sufficient to power one user equipment device until power supply status indicates a normal power state.

35. A control method as in claim 34, wherein said step (e) of monitoring characteristics comprises the steps of:
i) sensing the user line voltage on said user line; and
ii) extracting a dc component value from said sensed user line voltage, said dc component value being compared with set point values, said set point values defining an upper limit and a lower limit of said normal operating range.

36. A control method as in claim 35, wherein if said extracted dc component value is below said normal operating range, said line driver drive is increased in said step (g).

37. A control method as in claim 35, wherein if said extracted dc component value is above said normal operating range, said line driver drive values are decreased in said step (g).

38. A control method as in claim 35 wherein said step (e) of monitoring further comprises the step of:
iii) extracting a magnitude of a frequency component from said sensed user line voltage.

39. A control method as in claim 38, wherein the step (f) of determining comprises:
determining whether said frequency component magnitude is within a threshold magnitude range defined by set point values.

40. A control method as in claim 39, wherein when said extracted frequency component magnitude is below said threshold magnitude range, the step (g) of updating said line driver drive values includes increasing a frequency line driver drive value.

41. A control method as in claim 39, wherein when said extracted frequency component magnitude is above said threshold magnitude range, the step (g) of updating said line driver drive values includes decreasing a frequency line driver drive value.

42. A computer program product for controlling a line driver providing power to connected communications equipment, said computer program product comprising a computer usable medium having computer readable program code thereon, said computer readable program code comprising:
computer readable program code means for initializing line driver drive values;
computer readable program code means for setting a line driver drive in a line driver responsive to said line driver drive values;
computer readable program code means for measuring characteristics of the output of said line driver;
computer readable program code means for comparing said measured characteristics to set point values;
computer readable program code means for updating said line driver drive values in response to said comparison;
computer readable program code means for preventing said line driver drive values from being changed when a power failure variable indicates that efficient power supply operation is disabled.

43. A computer program product as in claim 42, said computer readable program code means for updating includes computer readable program code means for increasing said line driver drive values when said measured characteristics are less than said set point values.

44. A computer program product as in claim 42, said computer readable code means for updating includes computer readable program code means for decreasing said line driver drive values when said measured characteristics are greater than or equal to said set point values.

45. A computer program product as in claim 42, said computer program product further comprising:
computer readable program code means for determining when power supplied to said line driver is in an insufficient power state; and
computer readable program code means for setting said line driver drive values to predetermined minimum operating values when said determination indicates an insufficient power state.

46. A computer program product as in claim 42, said computer program product further comprising computer readable program code means for storing said line driver drive values in a storage unit.

47. A computer program product as in claim 42, wherein said computer readable program code means for measuring characteristics includes computer readable code means for extracting a dc voltage component value from said measured voltage.

48. A computer program product as in claim 47, wherein said computer readable program code means for comparing compares said extracted dc voltage component value with at least one of a lower set point value and an upper set point value, said computer readable code means for updating adjusting said line driver drive values responsive to said comparison.

49. A computer program product as in claim 48, wherein said computer readable program code means for updating includes:
  computer readable code means for increasing said line driver drive values when said dc voltage component value is less than said lower set point value; and
  computer readable code means for decreasing said line driver drive values when said dc voltage component value is greater than said upper set point value.

50. A computer program product as in claim 47, wherein said computer program product further includes computer readable dc voltage difference code means for comparing a current sensed dc voltage component value with a previous sensed dc voltage component value, load changes being identified by said comparison carried out by said computer readable dc voltage difference code means, said line driver drive values being adjusted in response to a dc voltage difference indicating a load change.

51. A computer program product as in claim 50, wherein said computer readable program code means for updating decreases said line driver drive values when said comparison carried out by said computer readable dc voltage difference code means indicates said load has decreased.

52. A computer program product as in claim 50, wherein said computer readable program code means for updating increases said line driver drive values when said comparison carried out by said computer readable dc voltage difference code means indicates said load has increased.

53. A programmable access point for interfacing a communications network with communications equipment located at user premises, said programmable access point comprising:
  a line driver having a load output and a drive level control input;
  at least one sensor having an input operably coupled to the load output of the line driver and an output to provide a line driver load signal; and
  a processing unit including at least a comparator, the comparator having a first input coupled to the sensing unit line driver load signal output, a second input coupled to receive an operating load limit, and a drive level control output coupled to the line driver drive level control input;
  a power supply having a power output coupled to a power input of said line driver, said power supply having a status signal output to indicate operating status of said power supply, said power supply status signal output coupled to a third input of said comparator, said line driver drive level operably adjusted responsive to said status signal output.

54. A programmable access point as in claim 53, said line driver load output coupled to a user communications line, user communications equipment connected to said user communications line, said line driver load output adapted to provide power to said user communications equipment adjusted in response to said comparator drive level control output.

55. A programmable access point as in claim 54, said comparator drive level control output decreasing when said sensed unit line driver load signal output is less than a lower operating load limit and increasing when said sensed unit line driver load signal output is greater than an upper operating load limit.

56. A programmable access point as in claim 55, said line driver load output comprising a drive voltage.

57. A programmable access point as in claim 56, wherein said sensing unit comprises a current sensor, said sensing unit output adapted to provide a sensed drive current signal, said drive voltage operably adjusted in response to said sensed drive current signal.

58. A programmable access point as in claim 57, said line driver load output comprising a drive current operably controlled by said line driver drive level.

59. A programmable access point as in claim 58 wherein said sensing unit comprises a voltage sensor, said sensing unit output adapted to provide a sensed line voltage signal, said drive current operably adjusted in response to said sensed line voltage signal.

60. A programmable access point as in claim 59 wherein said sensing unit output is adapted to provide a sensed dc voltage component signal, said drive current being adjusted in response to said sensed dc voltage component signal.

61. A programmable access point as in claim 60, said sensing unit further comprising a current sensor.

62. A programmable access point as in claim 55 further comprising:
  a communications unit having a network interface coupled to a communications network to receive a communications signal and an output coupled to a communications input of said line driver, said line driver load output adapted to drive said user communications line in response to said communications signal.

63. A programmable access point as in claim 53, wherein said line driver drive level is operably adjusted to a minimum operating level when said power supply status signal output indicates said power supply is in one of a low power state and a low capacity state.

64. A programmable access point as in claim 55 further comprising:
  a storage unit having a read output to provide a selected one of a provisioned value and a default value, said storage unit read output coupled to a memory input of said processing unit, said processing unit having an output to provide said operating load limit, said processing unit output coupled to said comparator second input, said operating load limit operably initialized to said selected one of said provisioned value and said default value.

* * * * *